(12) United States Patent
Najima et al.

(10) Patent No.: US 9,029,466 B2
(45) Date of Patent: May 12, 2015

(54) RESIN COMPOSITION FOR AQUEOUS COATING MATERIAL, METHOD FOR PRODUCING THE SAME, AND AQUEOUS COATING MATERIAL

(75) Inventors: Mitsuo Najima, Tokyo (JP); Noboru Ohara, Saitama (JP); Masao Watanabe, Koshigaya (JP); Takashi Isogai, Saitama (JP); Kenji Kawai, Koga (JP)

(73) Assignee: Fujikura Kasei Co., Ltd., Tokyo (JP)

( * ) Notice: Subject to any disclaimer, the term of this patent is extended or adjusted under 35 U.S.C. 154(b) by 1171 days.

(21) Appl. No.: 12/532,029

(22) PCT Filed: Mar. 4, 2008

(86) PCT No.: PCT/JP2008/053819
§ 371 (c)(1),
(2), (4) Date: Sep. 18, 2009

(87) PCT Pub. No.: WO2008/126510
PCT Pub. Date: Oct. 23, 2008

(65) Prior Publication Data
US 2010/0144956 A1  Jun. 10, 2010

(30) Foreign Application Priority Data
Mar. 28, 2007  (JP) .................................. 2007-083765

(51) Int. Cl.
| | | |
|---|---|---|
| C08L 23/14 | (2006.01) | |
| C08L 33/02 | (2006.01) | |
| C08L 33/06 | (2006.01) | |
| C08L 33/08 | (2006.01) | |
| C09D 123/14 | (2006.01) | |
| C09D 133/06 | (2006.01) | |
| C09D 5/02 | (2006.01) | |
| C08F 255/08 | (2006.01) | |
| C09D 151/06 | (2006.01) | |

(52) U.S. Cl.
CPC .......... *C09D 123/145* (2013.01); *C09D 123/14* (2013.01); *C08L 33/08* (2013.01); *C08L 33/02* (2013.01); *C08L 23/14* (2013.01); *C08L 23/142* (2013.01); *C08L 33/06* (2013.01); *C09D 5/02* (2013.01); *C09D 133/06* (2013.01); *C08F 255/08* (2013.01); *C09D 151/06* (2013.01)

(58) Field of Classification Search
CPC ....... C08L 23/142; C08L 23/14; C08L 33/06; C08L 33/08; C08L 33/02; C08L 2666/04; C08L 2666/06; C09D 123/145; C09D 123/14; C09D 133/06; C09D 5/02; C09D 151/06; C08F 255/08; C08F 212/08
USPC ........................................................ 524/522
See application file for complete search history.

(56) References Cited

U.S. PATENT DOCUMENTS

| | | | | |
|---|---|---|---|---|
| 2004/0162403 A1* | 8/2004 | Shimizu et al. | ................ | 526/160 |
| 2005/0004244 A1* | 1/2005 | Hanada et al. | ................ | 521/142 |
| 2005/0124753 A1 | 6/2005 | Ashihara et al. | | |
| 2005/0256272 A1 | 11/2005 | Najima et al. | | |
| 2007/0037923 A1* | 2/2007 | Shiba et al. | ................... | 524/556 |

FOREIGN PATENT DOCUMENTS

| | | |
|---|---|---|
| JP | 09-165489 | 6/1997 |
| JP | 09-316134 | 12/1997 |
| JP | 2000-264933 | 9/2000 |
| JP | 2000-281960 A | 10/2000 |
| JP | 2000-344972 | 12/2000 |
| JP | 2000-345097 | 12/2000 |
| JP | 2001-179909 A | 7/2001 |
| JP | 2004-115712 | 4/2004 |

OTHER PUBLICATIONS

English Machine Translation of JP 2000-345097 to Tokita et al., Dec. 12, 2000.*
Japanese Patent Office, Search Report and Written Opinion in International Patent Application No. PCT/JP2008/053819 dated Jun. 10, 2008.
European Patent Office; Search Report in European Patent Application No. 08721239 dated Nov. 5, 2010; 6 pages.
Caijun Xian, "Nano Building Material," Chemical Industrial Press, Issue 1, pp. 138-139 and English language translation (Aug. 2003) (6 pages).
Feng Xu et al., "Spraying Film Waterproof Material and Application," Chemical Industrial Press, Issue 1, pp. 172-173 and English language translation (Jan. 2007) (6 pages).
Republic of China Patent Office, Notification of Reexamination of corresponding Chinese Patent Application No. 200880002478.0 and English language translation (May 6, 2014) (13 pages).

* cited by examiner

*Primary Examiner* — Angela C Scott
(74) *Attorney, Agent, or Firm* — Wood, Herron & Evans, LLP

(57) ABSTRACT

A resin composition for an aqueous coating material that includes a propylene-butene resin component and/or propylene-ethylene-butene resin component (A), and a (meth) acrylic resin component (B), wherein the mass ratio between the propylene-butene resin component and/or propylene-ethylene-butene resin component (A) and the (meth)acrylic resin component (B) is within a range from 15:85 to 75:25. Also disclosed are a method for producing such a resin composition and an aqueous coating material. The present invention is able to provide a resin composition for an aqueous coating material that is useful as a binder within an aqueous coating material that uses no organic solvents or chlorine compounds, and yet exhibits excellent adhesion to polyolefin-based resins and is capable of forming a coating film that is resistant to discoloration and exhibits favorable resistance to the oils contained within gasoline, cosmetic products and foodstuffs and the like, and is also able to provide a method for producing the resin composition and an aqueous coating material that uses the resin composition.

8 Claims, No Drawings

RESIN COMPOSITION FOR AQUEOUS COATING MATERIAL, METHOD FOR PRODUCING THE SAME, AND AQUEOUS COATING MATERIAL

TECHNICAL FIELD

The present invention relates to a resin composition for an aqueous coating material that is useful as an aqueous coating material binder, a method for producing the resin composition, and an aqueous coating material that uses the resin composition.

Priority is claimed on Japanese Patent Application No. 2007-083765, filed Mar. 28, 2007, the content of which is incorporated herein by reference.

BACKGROUND ART

Polyolefin-based resins and the like are widely used for internal componentry within motor vehicles such as instrument panels, air bag covers and dashboards. In these internal components, the surface of the component is usually subjected to a coating treatment. In the coating material used in the coating treatment, a chlorinated polyolefin-based resin that has been either blended with any of a variety of different resins or modified with any of a variety of different resins is typically used as a coating material binder in order to enhance the adhesion to polyolefin-based resins.

However, these chlorinated polyolefin-based resins only dissolve in organic solvents such as toluene and xylene, meaning the obtained coating materials are so-called organic solvent-based coating materials, which contain large amounts of organic solvent and suffer many problems in terms of environmental contamination and the like.

Accordingly, Patent Document 1 discloses an aqueous coating material that uses an aqueous resin composition containing modified resin particles obtained by using a polymerizable monomer to cause swelling of chlorinated polyolefin resin particles within an aqueous dispersion containing the dispersed chlorinated polyolefin resin particles, and subsequently polymerizing the polymerizable monomer.

[Patent Document 1]
Japanese Patent (Granted) Publication No. 3,346,207

DISCLOSURE OF INVENTION

Problems to be Solved by the Invention

However, in the case of the coating material disclosed in Patent Document 1, if the coating film is touched with a hand that has been in contact with a cosmetic product or foodstuff or the like, then the oil contained therein tends to cause damage or peeling of the coating film, or dechlorination tends to cause yellow discoloration of the coating film. Further, because chlorinated polyolefin resin particles generate chlorine compounds when incinerated, they tend to cause damage to the ozone layer. Accordingly, in recent years, environmental concerns have also resulted in demands for alternatives to chlorinated polyolefin resin particles.

The present invention has been developed in light of the above circumstances, and has an object of providing a resin composition for an aqueous coating material that is useful as a binder within an aqueous coating material that uses no organic solvents or chlorine compounds, and yet exhibits excellent adhesion to polyolefin-based resins, and is capable of forming a coating film that is resistant to discoloration and exhibits favorable resistance to the oils contained within gasoline, cosmetic products and foodstuffs and the like, as well as providing a method for producing the resin composition and an aqueous coating material that uses the resin composition.

Means to Solve the Problems

A resin composition for an aqueous coating material according to the present invention contains a propylene-butene resin component and/or propylene-ethylene-butene resin component (A), and a (meth)acrylic resin component (B), wherein the mass ratio between the propylene-butene resin component and/or propylene-ethylene-butene resin component (A) and the (meth)acrylic resin component (B) is within a range from 15:85 to 75:25.

The (meth)acrylic resin component (B) is preferably (meth)acrylic resin particles (B-1) obtained by polymerizing a monomer raw material liquid containing at least a (meth)acrylic monomer, and/or polyolefin-modified (meth)acrylic resin particles (B-2) obtained by swelling propylene-ethylene-butene resin particles with the above monomer raw material liquid, and then polymerizing the monomer raw material liquid.

Further, the mass ratio between the propylene-ethylene-butene resin particles and the monomer raw material liquid in the polyolefin-modified (meth)acrylic resin particles (B-2) is preferably within a range from 15:85 to 85:15.

Moreover, the polyolefin-modified (meth)acrylic resin particles (B-2) preferably include a metal (meth)acrylate and/or a bifunctional or higher polymerizable monomer.

Furthermore, a method for producing a resin composition for an aqueous coating material according to the present invention is a method for producing the above-mentioned resin composition for an aqueous coating material, wherein the method may include mixing polyolefin-modified (meth)acrylic resin particles (B-2), obtained by swelling propylene-ethylene-butene resin particles dispersed in water with a monomer raw material liquid containing at least a (meth)acrylic monomer, in the presence of a lipophilic peroxide, and then performing a polymerization, with a propylene-butene resin component and/or propylene-ethylene-butene resin component (A).

Moreover, the propylene-ethylene-butene resin particles are preferably swelled, in the presence of the lipophilic peroxide, using 1 to 50% by mass of the 100% by mass of the monomer raw material liquid, and the remainder of the monomer raw material liquid is then preferably added dropwise to polymerize the polyolefin-modified (meth)acrylic resin particles (B-2).

Furthermore, the polyolefin-modified (meth)acrylic resin particles (B-2) are preferably polymerized by adding 0.1 to 10% by mass of a metal (meth)acrylate and/or a bifunctional or higher polymerizable monomer as a cross-linking component (provided that the combined total of the cross-linking component and the monomer raw material liquid containing at least a (meth)acrylic monomer is 100% by mass).

An aqueous coating material of the present invention preferably uses the above-mentioned resin composition for an aqueous coating material.

Effects of the Invention

The present invention is able to provide a resin composition for an aqueous coating material that is useful as a binder within an aqueous coating material that uses no organic solvents or chlorine compounds, and yet exhibits excellent adhesion to polyolefin-based resins, and is capable of forming a coating film that is resistant to discoloration and exhibits favorable resistance to the oils contained within gasoline, cosmetic products and foodstuffs and the like, as well as providing a method for producing the resin composition and an aqueous coating material that uses the resin composition.

BEST MODE FOR CARRYING OUT THE INVENTION

A more detailed description of the present invention is presented below.
[Resin Composition for an Aqueous Coating Material]

A resin composition for an aqueous coating material according to the present invention contains a propylene-butene resin component and/or propylene-ethylene-butene resin component (A), and a (meth)acrylic resin component (B), and can be used favorably as an aqueous coating material binder.

<Propylene-Butene Resin Component and/or Propylene-Ethylene-Butene Resin Component>

In the present invention, the propylene-butene resin component is a component obtained by copolymerizing propylene and butene, and the propylene-ethylene-butene resin component is a component obtained by copolymerizing propylene, ethylene and butene (hereafter this component may be referred to as "component (A)"). The copolymerization ratio of propylene:butene is preferably within a range from 20:80 to 95:5, and the copolymerization ratio of propylene:ethylene:butene is preferably within a range from 20:40:40 to 94:1:5. Commercially available products may be used as this type of propylene-butene resin component and/or propylene-ethylene-butene resin component. An example of the propylene-butene resin component is HARDLEN NA3006 manufactured by Toyo Kasei Kogyo Co., Ltd., whereas examples of the propylene-ethylene-butene resin component include HARDLEN NA3002 and HARDLEN NA3003 manufactured by Toyo Kasei Kogyo Co., Ltd.

The component (A) is preferably in particle form, as this facilitates mixing with the (meth)acrylic resin component (B) described below.

The amount of the component (A) within 100% by mass of the resin composition for an aqueous coating material is preferably within a range from 10 to 75% by mass, more preferably from 15 to 70% by mass, and still more preferably from 20 to 50% by mass. If the amount is less than the above-mentioned lower limit, then the adhesion to polyolefin-based resins may deteriorate, and the coating material may detach upon rubbing with a fingernail or the like. This detachment tends to become more likely in those cases where the coating material has been eroded with the types of oil contained within foodstuffs and the like. In contrast, if the amount exceeds the above-mentioned upper limit, then the formed coating film tends to be softer, meaning the coating film is more likely to develop a sheen if rubbed with a fingernail or the like, and is more prone to erosion by the linear hydrocarbons within gasoline or the like (namely, has poor gasoline resistance).

<(Meth)Acrylic Resin Components>

The (meth)acrylic resin component (B) (hereafter also referred to as "component (B)") is preferably (meth)acrylic resin particles (B-1) and/or polyolefin-modified (meth)acrylic resin particles (B-2). From the viewpoint of improving the gasoline resistance, the proportion of polyolefin-modified (meth)acrylic resin particles (B-2) within the entire component (B) (100% by mass) is preferably within a range from 30 to 100% by mass, more preferably from 50 to 100% by mass, and still more preferably from 60 to 100% by mass.

Furthermore, the mass ratio between the component (A) and the component (B) preferably satisfies (A):(B)=15:85 to 75:25, more preferably 20:80 to 70:30, and still more preferably 30:70 to 60:40. If the proportion of the component (B) is less than the above-mentioned range, then the formed coating film tends to be softer, meaning the coating film is more likely to develop a sheen if rubbed with a fingernail or the like, and is more prone to erosion by the linear hydrocarbons within gasoline or the like (namely, has poor gasoline resistance). In contrast, if the proportion of the component (B) exceeds the above-mentioned range, then the adhesion to polyolefin-based materials may deteriorate, and the coating material may detach upon rubbing with a fingernail or the like. This detachment tends to become more likely in those cases where the coating material has been eroded with the types of oil contained within foodstuffs and the like.

((Meth)Acrylic Resin Particles (B-1))

The (meth)acrylic resin particles (B-1) are composed of a polymer obtained by polymerizing a monomer raw material liquid containing at least a (meth)acrylic monomer (hereafter also referred to as simply "the monomer raw material liquid").

Examples of the (meth)acrylic monomer include (meth)acrylic acid, 2-hydroxyethyl (meth)acrylate, methyl (meth)acrylate, ethyl (meth)acrylate, n-butyl (meth)acrylate, isobutyl (meth)acrylate, 2-ethylhexyl (meth)acrylate, benzyl (meth)acrylate, ethoxyethyl (meth)acrylate, butoxyethyl (meth)acrylate, cyclohexyl (meth)acrylate, and isobornyl (meth)acrylate. Of these, methyl (meth)acrylate and n-butyl (meth)acrylate are preferred. These (meth)acrylic monomers may be used individually, or in combinations containing two or more monomers.

In the present invention, the monomer raw material liquid is preferably composed solely of the (meth)acrylic monomer, although a (meth)acrylic monomer proportion that represents at least 70% by mass of the 100% by mass of the monomer raw material liquid is acceptable. If the amount of the (meth)acrylic monomer is less than 70% by mass, then the water resistance of the coating film tends to deteriorate, and discoloration tends to become noticeable.

In addition to the (meth)acrylic monomer described above, the monomer raw material liquid may also contain other monomers, including vinyl-based monomers such as styrene, vinyl acetate and maleic anhydride. Of these, styrene is preferred. The amount of these other monomers, within 100% by mass of the monomer raw material liquid, is preferably within a range from 0 to 30% by mass, more preferably from 0 to 20% by mass, and most preferably from 10 to 20% by mass.

(Polyolefin-modified (meth)acrylic resin particles (B-2))

The polyolefin-modified (meth)acrylic resin particles (B-2) are composed of a polymer obtained by swelling propylene-ethylene-butene resin particles with the above monomer raw material liquid, and subsequently polymerizing the monomer raw material liquid. The mass ratio between the propylene-ethylene-butene resin particles and the monomer raw material liquid is preferably within a range from 15:85 to 85:15, more preferably from 20:80 to 80:20, and most preferably from 30:70 to 60:40. If the proportion of the propylene-ethylene-butene resin particles is less than the above-mentioned range, then the formed coating film tends to be prone to detachment when eroded with the types of oil contained within foodstuffs and the like. In contrast, if the proportion of the propylene-ethylene-butene resin particles exceeds the above-mentioned range, then the gasoline resistance tends to deteriorate.

In the present invention, the term "swelling" describes the phenomenon wherein the propylene-ethylene-butene resin particles absorb the monomer raw material liquid, causing an increase in the volume of the propylene-ethylene-butene resin particles.

The polyolefin-modified (meth)acrylic resin particles (B-2) preferably include a metal (meth)acrylate and/or a bifunctional or higher polymerizable monomer as a cross-linking component. Of these options, from the viewpoints of ensuring a small particle size for the resin particles and enabling stabilization of the emulsion of the resin particles, a metal (meth)acrylate is preferred. These cross-linking components may be used individually, or in combinations containing two or more different cross-linking components.

Examples of the metal (meth)acrylate include sodium (meth)acrylate, potassium (meth)acrylate, calcium (meth)acrylate, barium (meth)acrylate, copper (meth)acrylate, strontium (meth)acrylate, magnesium (meth)acrylate, nickel (meth)acrylate, aluminum (meth)acrylate and zinc (meth)acrylate. Commercially available products may be used. One example of such a commercially available product is ZN-DA100 manufactured by Nippon Shokubai Co., Ltd.

Examples of the bifunctional or higher polymerizable monomer include divinylbenzene, 1,6-hexanediol diacrylate, neopentyl glycol diacrylate, trimethylolpropane triacrylate, pentaerythritol tetraacrylate, dipentaerythritol pentaacrylate, and dipentaerythritol hexaacrylate.

Commercially available products may be used. One example of such a commercially available product is "trimethylolpropane triacrylate (TMPTA)" manufactured by Nippon Kayaku Co., Ltd.

The amount of the cross-linking component, in the case where the combination of the cross-linking component and the monomer raw material liquid is deemed to be 100% by mass, is preferably within a range from 0.1 to 10% by mass, and more preferably from 0.2 to 7% by mass. The amount of the cross-linking component is most preferably within a range from 0.5 to 3% by mass. If the amount is less than the above-mentioned lower limit, then the cross-linking effect is minimal, and the gasoline resistance and oil resistance tend to deteriorate.

In contrast, if the amount exceeds the above-mentioned upper limit, then the film formability tends to deteriorate, and the adhesiveness tends to worsen.

(Other)

The component (B) also includes an emulsifying agent and a polymerization initiator as other additives.

In terms of water resistance, the emulsifying agent is preferably a reactive surfactant, and is more preferably a vinyl-group containing surfactant. Specific examples include nonylphenoxypolyethylene glycol mono(meth)acrylate, nonylphenoxypolypropylene glycol mono(meth)acrylate, stearoxypolyethylene glycol mono(meth)acrylate, stearoxypolypropylene glycol mono(meth)acrylate, lauroxypolyethylene glycol mono(meth)acrylate, lauroxypolypropylene glycol mono(meth)acrylate, sodium (meth)acryloyloxyethylsulfonate, potassium (meth)acryloyloxyethylsulfonate, and calcium (meth)acryloyloxyethylsulfonate. Commercially available products may be used. One example of such a commercially available product is ADEKA REASOAP SR-1025 manufactured by Adeka Corporation.

As the polymerization initiator, a water-soluble polymerization initiator is preferred in those cases where the (meth)acrylic resin particles (B-1) are polymerized. Examples of such water-soluble polymerization initiators include the polymerization initiators used in typical emulsion polymerization reactions, and specific examples include potassium persulfate, ammonium persulfate, hydrogen peroxide, and 4,4'-azobis(4-cyanovaleric acid).

On the other hand, a lipophilic peroxide is preferred in those cases where the polyolefin-modified (meth)acrylic resin particles (B-2) are polymerized. A lipophilic peroxide dissolves readily in the (meth)acrylic monomer within the above-mentioned monomer raw material liquid, and causes a graft polymerization by abstraction of hydrogen from the propylene-ethylene-butene resin particles that have been swollen within the (meth)acrylic monomer. Accordingly, because the polymerization can proceed without separation of the propylene-ethylene-butene resin particles and the (meth)acrylic monomer, a stable emulsion can be obtained. Examples of this type of lipophilic peroxide include methyl ethyl ketone peroxide, 1,1-di(t-hexylperoxy)cyclohexane, t-butyl peroxylaurate, t-butyl peroxybenzoate, and benzoyl peroxide. Commercially available products may be used. One example of such a commercially available product is PERBUTYL O manufactured by NOF Corporation.

If a water-soluble polymerization initiator is used for the polymerization of the polyolefin-modified (meth)acrylic resin particles (B-2), then because hydrogen abstraction from the propylene-ethylene-butene resin particles does not occur readily, only the (meth)acrylic monomer tends to polymerize. As a result, the propylene-ethylene-butene resin particles and the (meth)acrylic particles become prone to separation, resulting in an unstable emulsion.

<Other Components>

Besides the component (A) and the component (B) described above, the resin composition for an aqueous coating material according to the present invention may also include from 0 to 5% by mass of polyurethane resin particles or the like (within 100% by mass of the resin composition for an aqueous coating material).

[Production Method]

The resin composition for an aqueous coating material according to the present invention can be produced in the manner described below.

<Preparation of Component (B): in the Case of (Meth)Acrylic Resin Particles (B-1)>

The (meth)acrylic resin particles (B-1) can be prepared using a conventional emulsion polymerization method. Specifically, an emulsifying agent and water are mixed, in the presence of a polymerization initiator (a water-soluble peroxide), with a portion of the monomer raw material liquid (a first raw material liquid) containing at least the (meth)acrylic monomer, and following heating to a temperature of 60 to 95° C., the remainder of the monomer raw material liquid (a second raw material liquid) is added dropwise over a period of 1 to 3 hours. The polymerization is then allowed to proceed until the reaction is complete, yielding the (meth)acrylic resin particles (B-1). An amount of 1 to 50% by mass of the 100% by mass of the total monomer raw material liquid is preferably used as the first raw material liquid, and this amount is more preferably from 2 to 30% by mass, and most preferably from 10 to 30% by mass. If the amount of the first raw material liquid is less than the above-mentioned lower limit, then the polymerization time becomes unnecessarily long. In contrast, if the amount of the first raw material liquid exceeds the above-mentioned upper limit, then the heat generated by the polymerization becomes too great, and controlling the reaction temperature becomes problematic.

The polymerization time varies depending on the types of monomer and polymerization initiator used, but is typically within a range from 3 to 10 hours.

<Preparation of Component (B): in the Case of Polyolefin-Modified (Meth)Acrylic Resin Particles (B-2)>

First, water and an emulsifying agent are mixed together, and the propylene-ethylene-butene resin particles are then added and dispersed to prepare a dispersion. Subsequently, the monomer raw material liquid containing the (meth)acrylic monomer is added to the dispersion in the presence of a polymerization initiator (a lipophilic peroxide), and the propylene-ethylene-butene resin particles are swollen with the monomer raw material liquid. Subsequently, the temperature is raised to 60 to 95° C. and a polymerization is conducted, thus yielding the polyolefin-modified (meth)acrylic resin particles (B-2). The polymerization time is similar to that for the (meth)acrylic resin particles (B-1).

The polymerization initiator may also be dissolved in advance in the monomer raw material liquid to form a monomer solution, and this monomer solution then added to the dispersion.

In the present invention, the monomer raw material liquid may be added in a single batch, or may be added in two batches. By adding the monomer raw material liquid in two separate portions, the propylene-ethylene-butene resin particles can be better swollen by the monomer raw material liquid, meaning the graft polymerization of the propylene-ethylene-butene resin particles that proceeds via hydrogen abstraction can occur more effectively. In those cases where two separate portions are added, a portion of the monomer raw material liquid (a first raw material liquid) is added to the dispersion in the presence of the polymerization initiator (the lipophilic peroxide), and following swelling of the propylene-ethylene-butene resin particles, the temperature is raised to 60 to 95° C., and the remainder of the monomer raw material liquid is added dropwise over a period of 1 to 3 hours to effect the polymerization. An amount of 1 to 50% by mass of the 100% by mass of the total monomer raw material liquid is preferably used as the first raw material liquid, and this amount is more preferably from 2 to 30% by mass, and most preferably from 10 to 30% by mass. If the amount of the first raw material liquid is less than the above-mentioned lower limit, then the swelling of the propylene-ethylene-butene resin particles by the monomer raw material liquid tends to be inadequate, and the graft polymerization of the propylene-ethylene-butene resin particles that proceeds via hydrogen abstraction tends to proceed poorly. In contrast, if the amount of the first raw material liquid exceeds the above-mentioned upper limit, then the swelling of the propylene-ethylene-butene resin particles by the monomer raw material liquid may become excessive, which can cause an increase in the emulsion viscosity, and may result in the collapse of the polyolefin-modified (meth)acrylic resin particles (B-2) during the polymerization process.

The polymerization initiator may also be dissolved in advance in the monomer raw material liquid to form a monomer solution, and this monomer solution then added to the dispersion in two separate portions.

Furthermore, the polyolefin-modified (meth)acrylic resin particles (B-2) may be polymerized by adding 0.1 to 10% by mass of a metal (meth)acrylate and/or a bifunctional or higher polymerizable monomer as a cross-linking component. The amount added of the cross-linking component is preferably within a range from 0.2 to 7% by mass. The combination of the monomer raw material liquid and the cross-linking component represents 100% by mass.

In terms of the timing of the addition of the cross-linking component, in those cases where the cross-linking component is a metal (meth)acrylate, the metal (meth)acrylate is preferably added alone following the addition of all of the monomer raw material liquid. On the other hand, in those cases where the cross-linking component is a bifunctional or higher polymerizable monomer, because these types of polymerizable monomer tend to be soluble in (meth)acrylic monomers, the cross-linking component may be mixed with the monomer raw material liquid prior to addition, or the cross-linking component may be added alone following the addition of all of the monomer raw material liquid.

Further, in those cases where a metal (meth)acrylate and a bifunctional or higher polymerizable monomer are used in combination as the cross-linking component, the cross-linking component may be added following the addition of all of the monomer raw material liquid, or the bifunctional or higher polymerizable monomer may be mixed with the monomer raw material liquid prior to addition, with the metal (meth)acrylate being added alone following the addition of the monomer raw material liquid.

If a metal (meth)acrylate is added as the cross-linking component, then the metal (meth)acrylate is oriented on the outside of the polyolefin-modified (meth)acrylic resin particles (B-2) ensuring a fine particle size, and therefore the emulsion can be stabilized. The polyolefin-modified (meth)acrylic resin particles (B-2) bearing the oriented metal (meth)acrylate undergoes cross-linking between the particles when the emulsion is used to form a coating film. In contrast, if a bifunctional or higher polymerizable monomer is added as the cross-linking component, then the polyolefin-modified (meth)acrylic resin particles (B-2) tend to undergo intra-particle cross-linking.

Furthermore, if a metal (meth)acrylate and a bifunctional or higher polymerizable monomer are used in combination, then the polyolefin-modified (meth)acrylic resin particles (B-2) undergo intra-particle cross-linking, and then also undergo inter-particle cross-linking when the emulsion is used to form a coating film.

<Production of Resin Composition for an Aqueous Coating Material>

The resin composition for an aqueous coating material is produced by mixing the component (B) and the component (A) prepared in the manner described above, together with polyurethane resin particles if required.

[Aqueous Coating Material]

An aqueous coating material of the present invention includes the above resin composition for an aqueous coating material as a binder.

The amount of the resin composition for an aqueous coating material (reported as a solid fraction), within 100% by mass of the aqueous coating material, is preferably within a range from 10 to 50% by mass, and more preferably from 20 to 40% by mass. The amount is most preferably within a range from 30 to 40% by mass. If the amount of the resin composition for an aqueous coating material is less than the above-mentioned lower limit, then the binder effect weakens, and the adhesion to polyolefin-based resins tends to deteriorate. In contrast, if the amount exceeds the above-mentioned upper limit, then the viscosity tends to increase when the aqueous coating material is formed, which tends to impair the coating operation, and makes it more difficult to achieve design features such as a matte finish.

The aqueous coating material of the present invention may include appropriate amounts of various additives according to need, such as inorganic fillers, resin beads, film formation assistants, colorants or the like for achieving coloration, anti-foaming agents, and thickeners.

Examples of the inorganic fillers include extender pigments, colored pigments, photoluminescent pigments, and silica and the like. Of these, extender pigments are preferred. There are no particular restrictions on the extender pigments, provided they are typically used in coating materials, and specific examples include calcium carbonate, calcium sulfate, talc clay, barium sulfate, silicon oxide, bentonite, magnesium carbonate, barium carbonate, and diatomaceous earth. Of these, from the viewpoint of cost, calcium carbonate is preferred.

The amount of the inorganic filler (reported as a solid fraction), within 100% by mass of the aqueous coating material, is preferably within a range from 0 to 25% by mass, more preferably from 2 to 20% by mass, and is most preferably from 10 to 20% by mass.

Examples of the resin beads include acrylic resin beads and urethane resin beads and the like. Of these, acrylic resin beads are preferred, and commercially available products may be used. One example of such a commercially available product is MR-7G manufactured by Soken Chemical & Engineering Co., Ltd. Any of these resin beads may be used individually, or two or more types of beads may be used in combination.

The amount of the resin beads (reported as a solid fraction), within 100% by mass of the aqueous coating material, is preferably within a range from 0 to 20% by mass, more preferably from 2 to 15% by mass, and is most preferably from 5 to 15% by mass.

Examples of the film formation assistants include hydrophobic film formation assistants and hydrophilic film formation assistants, and commercially available products may be used. An example of a commercially available hydrophobic film formation assistant is DOWANOL DPnB manufactured by Dow Chemical Japan Ltd. An example of a commercially available hydrophilic film formation assistant is butyl cellosolve manufactured by Taihei Kasei Co., Ltd. Any of these film formation assistants may be used individually, or two or more different film formation assistants may be used in combination.

The amount of the film formation assistant (reported as a solid fraction), within 100% by mass of the aqueous coating material, is preferably within a range from 0.1 to 10% by mass, more preferably from 1 to 5% by mass, and is most preferably from 3 to 5% by mass.

Examples of colorants that may be used include those colorants used in typical coating materials, including organic pigments and inorganic pigments. The amount of the colorant (reported as a solid fraction), relative to 100% by mass of the aqueous coating material, is preferably within a range from 0 to 15% by mass, more preferably from 0 to 10% by mass, and is most preferably from 2 to 10% by mass.

Other additives such as antifoaming agents and thickeners may use appropriate amounts of the types of antifoaming agents and thickeners used in typical coating materials.

The aqueous coating material of the present invention is obtained by adding each of the above optional components as required to the aforementioned resin composition for an aqueous coating material, stirring the resulting mixture, adding water, and then once again stirring the resulting mixture.

The water content, within 100% by mass of the aqueous coating material is preferably within a range from 30 to 80% by mass, and is more preferably from 40 to 70% by mass. The water content is most preferably within a range from 50 to 70% by mass.

By applying this type of aqueous coating material to a substrate formed from a polyolefin-based resin and subsequently drying the coating material, a coating film can be formed that exhibits excellent adhesion to the substrate, favorable resistance to the oils contained within gasoline, cosmetic products and foodstuffs and the like, and superior resistance to discoloration.

There are no particular restrictions on the thickness of the coating film formed on the substrate, which may be set as desired, although a typical thickness is within a range from 15 to 50 µm. If the thickness is thinner than the above-mentioned range, then the strength of the coating film tends to deteriorate, and the adhesion between the coating film and the substrate, and the resistance of the coating film to oils also tend to deteriorate. In contrast, if the coating film is thicker than the above-mentioned range, then the cost increases, and if the substrate is coated in an upright arrangement, then the coating film may sag.

As the material of the substrate on which this type of coating film is formed, although polyolefin-based resins are ideal, other resins (such as ABS resins and PS resins), metals and wood materials may also be used.

Further, in terms of the target products onto which the aqueous coating material of the present invention may be coated, although all manner of resin-molded products such as vehicle instrument panels, air bag covers and dashboards are ideal, other products such as metal products and wooden products may also be used. The coated items obtained by applying the coating material to these types of target products are provided with a coating film that exhibits favorable resistance to the oils contained within gasoline, cosmetic products and foodstuffs and the like, and superior resistance to discoloration. Accordingly, even if the coating film is touched with a hand that has been in contact with a cosmetic product or foodstuff or the like, the coating film is unlikely to suffer from peeling or yellow discoloration caused by dechlorination.

There are no particular restrictions on the method used for applying the aqueous coating material, and conventional methods such as brush coating, spraying or dipping may be used.

As described above, the resin composition for an aqueous coating material according to the present invention includes a propylene-butene resin component and/or propylene-ethylene-butene resin component (A), and a (meth)acrylic resin component (B), and therefore exhibits excellent adhesion to polyolefin-based resins, is capable of forming a coating film that exhibits favorable resistance to the oils contained within gasoline, cosmetic products and foodstuffs and the like, and excellent resistance to discoloration, and is very useful as a binder for an aqueous coating material.

Furthermore, because the aqueous coating material of the present invention requires no organic solvents or chlorine compounds, it also offers superior environmental friendliness.

This type of aqueous coating material is ideal for use on internal componentry within motor vehicles such as instrument panels, air bag covers and dashboards, which are prone to soiling and scratching, and for which such soiling and scratching tends to be conspicuous.

EXAMPLES

A more detailed description of the present invention is presented below using a series of example, although the present invention is in no way limited by these examples. In the examples, the units "parts" represents "parts by mass", and "%" represents "% by mass".

The components used in the examples are listed below.
Component (A):
Propylene-butene resin component (abbreviated as P-B in the tables): polyolefin resin particles HARDLEN NA3006, manufactured by Toyo Kasei Kogyo Co., Ltd.
Propylene-ethylene-butene resin component (abbreviated as P-E-B in the tables): polyolefin resin particles HARDLEN NA3002, manufactured by Toyo Kasei Kogyo Co., Ltd.
Emulsifying agent: anionic reactive surfactant ADEKA REASOAP SR-1025, manufactured by Adeka Corporation.

Polymerization initiator: potassium persulfate, manufactured by Wako Pure Chemical Industries, Ltd.

Polymerization initiator: PERBUTYL 0, manufactured by NOF Corporation.

Cross-linking component: trimethylolpropane triacrylate TMPTA, manufactured by Nippon Kayaku Co., Ltd.

Cross-linking component: zinc diacrylate ZN-DA 100, manufactured by Nippon Shokubai Co., Ltd.

Chlorinated polypropylene particles (chlorinated PP): SUPERCHLON E-603, manufactured by Nippon Paper Chemicals Co., Ltd.

Film formation assistant: hydrophobic film formation assistant DOWANOL DPnB, manufactured by Dow Chemical Japan Ltd.

Film formation assistant: hydrophilic film formation assistant, butyl cellosolve, manufactured by Taihei Kasei Co., Ltd.

Antifoaming agent: SN DEFOAMER 1070, manufactured by San Nopco Ltd.

Inorganic filler: extender pigment NITOREX #80 (calcium carbonate), manufactured by Nitto Funka Kogyo Co., Ltd.

Resin beads: acrylic resin beads MR-7G, manufactured by Soken Chemical & Engineering Co., Ltd.

Thickener: a 2% aqueous solution of carboxymethylcellulose (CMC).

Colorant: T0193118, manufactured by Red Spot Paint & Varnish Co., Inc.

[Preparation of (Meth)Acrylic Resin Components]
<(Meth)acrylic resin particles (B-1): AC-01>

As the monomer raw material liquid, a monomer mixture (286 g) having a mass ratio of styrene (ST):methyl methacrylate (MMA):butyl acrylate (BA):methacrylic acid=20:65:10:5 was used.

A 1 liter four neck flask was charged with 48 g of the emulsifying agent, 330 g of pure water, 29 g of the monomer raw material liquid (equivalent to 10% of the total monomer raw material liquid) and 1.5 g of potassium persulfate as a polymerization initiator, and the temperature was raised to 75° C. Subsequently, 257 g of the monomer raw material liquid (equivalent to 90% of the total monomer raw material liquid) was added dropwise to the flask over a period of two hours, and the polymerization reaction was then continued for 5 hours at 75° C., thus completing the preparation of (meth) acrylic resin particles (AC-01).

The resin solid fraction of the obtained AC-01 was 35%.
<Polyolefin-modified (meth)acrylic resin particles (B-2): PO-01>

As the monomer raw material liquid, a monomer mixture (200 g) having a mass ratio of ST:MMA:BA=20:40:40 was used.

A 1 liter four neck flask was charged with 330 g of pure water, 48 g of the emulsifying agent, and 287 g of propylene-ethylene-butene resin particles (resin solid fraction: 86 g), and a dispersion was prepared. Meanwhile, a monomer solution was prepared by dissolving 4 g of PERBUTYL 0 as a polymerization initiator within the 200 g of the monomer raw material liquid. Subsequently, 10.2 g of the prepared monomer solution (equivalent to 5% of the total monomer raw material liquid and 5% of the polymerization initiator) was added to the previously prepared dispersion, and the resulting mixture was stirred for 30 minutes, thereby swelling the propylene-ethylene-butene resin particles. Subsequently, the temperature was raised to 75° C., 193.8 g of the monomer solution (equivalent to 95% of the total monomer raw material liquid and 95% of the polymerization initiator) was added dropwise to the flask over a period of two hours, and the polymerization reaction was then continued for 5 hours at 75° C., thus completing the preparation of polyolefin-modified (meth)acrylic resin particles (PO-01).

The resin solid fraction of the obtained PO-01 was 35%. Further, the mass ratio of propylene-ethylene-butene resin particles (resin solid fraction): monomer raw material liquid was 30:70.
<Polyolefin-Modified (Meth)Acrylic Resin Particles (B-2): PO-02>

A monomer mixture composed of ST, MMA and BA was used as the monomer raw material liquid, and TMPTA was used as a cross-linking component. The TMPTA was mixed with the monomer mixture prior to reaction. The mass ratio of the various components was ST:MMA:BA:TMPTA=19:39:40:2, and the total mass was 200 g.

With the exception of using these components, the particles PO-02 were prepared in the same manner as PO-01.

The resin solid fraction of the obtained PO-02 was 35%. Further, the mass ratio of propylene-ethylene-butene resin particles (resin solid fraction): monomer raw material liquid was 30:70.
<Polyolefin-Modified (Meth)Acrylic Resin Particles (B-2): PO-03>

A monomer mixture (196 g) composed of ST, MMA and BA was used as the monomer raw material liquid, and zinc diacrylate (4 g) was used as a cross-linking component. The mass ratio of the various components was ST:MMA:BA:zinc diacrylate=19:39:40:2.

A 1 liter four neck flask was charged with 318 g of pure water, 48 g of the emulsifying agent, and 287 g of propylene-ethylene-butene resin particles (resin solid fraction: 86 g), and a dispersion was prepared. Meanwhile, a monomer solution was prepared by dissolving 4 g of PERBUTYL 0 as a polymerization initiator within the 196 g of the monomer raw material liquid. Subsequently, 10.0 g of the prepared monomer solution (equivalent to 5% of the total monomer raw material liquid and 5% of the polymerization initiator) was added to the previously prepared dispersion, and the resulting mixture was stirred for 30 minutes, thereby swelling the propylene-ethylene-butene resin particles. Subsequently, the temperature was raised to 75° C., and 190 g of the monomer solution (equivalent to 95% of the total monomer raw material liquid and 95% of the polymerization initiator) was added dropwise to the flask over a period of two hours. Following completion of the dropwise addition, the 4 g of the cross-linking component and 12 g of pure water were added, and the polymerization reaction was continued for 5 hours at 75° C., thus completing the preparation of polyolefin-modified (meth)acrylic resin particles (PO-03).

The resin solid fraction of the obtained PO-03 was 35%. Further, the mass ratio of propylene-ethylene-butene resin particles (resin solid fraction): monomer raw material liquid was 30:70.
<Polyolefin-Modified (Meth)Acrylic Resin Particles (B-2): PO-04>

A monomer mixture composed of ST, MMA and BA was used as the monomer raw material liquid, and TMPTA and zinc diacrylate were used as cross-linking components. The TMPTA was mixed with the monomer mixture prior to reaction. The mass ratio of the various components was ST:MMA:BA:TMPTA:zinc diacrylate=19:39:40:1:1, and the total mass was 200 g.

A 1 liter four neck flask was charged with 318 g of pure water, 48 g of the emulsifying agent, and 287 g of propylene-ethylene-butene resin particles (resin solid fraction: 86 g), and a dispersion was prepared. Meanwhile, a monomer solution was prepared by dissolving 4 g of PERBUTYL 0 as a polymerization initiator within 198 g of the monomer raw material liquid. Subsequently, 10.1 g of the prepared monomer solution (equivalent to 5% of the total monomer raw material liquid (including TMPTA) and 5% of the polymerization initiator) was added to the previously prepared dispersion, and the resulting mixture was stirred for 30 minutes, thereby swelling the propylene-ethylene-butene resin particles. Subsequently, the temperature was raised to 75° C., and 191.9 g of the monomer solution (equivalent to 95% of the total monomer raw material liquid (including TMPTA) and 95% of the polymerization initiator) was added dropwise to the flask over a period of two hours. Following completion of the dropwise addition, the 2 g of zinc diacrylate and 12 g of pure water were added, and the polymerization reaction was continued for 5 hours at 75° C., thus completing the preparation of polyolefin-modified (meth)acrylic resin particles (PO-04).

The resin solid fraction of the obtained PO-04 was 35%. Further, the mass ratio of propylene-ethylene-butene resin particles (resin solid fraction): monomer raw material liquid was 30:70.

<Polyolefin-Modified (Meth)Acrylic Resin Particles (B-2): PO-05>

A monomer mixture composed of ST, MMA and BA was used as the monomer raw material liquid, and TMPTA was used as a cross-linking component. The TMPTA was mixed with the monomer mixture prior to reaction. The mass ratio of the various components was ST:MMA:BA:TMPTA=19:39:40:2, and the total mass was 229 g.

A 1 liter four neck flask was charged with 330 g of pure water, 48 g of the emulsifying agent, and 190 g of propylene-ethylene-butene resin particles (resin solid fraction: 57 g), and a dispersion was prepared. Meanwhile, a monomer solution was prepared by dissolving 4.6 g of PERBUTYL 0 as a polymerization initiator within the 229 g of the monomer raw material liquid. Subsequently, 23.36 g of the prepared monomer solution (equivalent to 10% of the total monomer raw material liquid (including TMPTA) and 10% of the polymerization initiator) was added to the previously prepared dispersion, and the resulting mixture was stirred for 30 minutes, thereby swelling the propylene-ethylene-butene resin particles. Subsequently, the temperature was raised to 75° C., 210.24 g of the monomer solution (equivalent to 90% of the total monomer raw material liquid (including TMPTA) and 90% of the polymerization initiator) was added dropwise to the flask over a period of two hours, and the polymerization reaction was then continued for 5 hours at 75° C., thus completing the preparation of polyolefin-modified (meth)acrylic resin particles (PO-05).

The resin solid fraction of the obtained PO-05 was 35%. Further, the mass ratio of propylene-ethylene-butene resin particles (resin solid fraction): monomer raw material liquid was 20:80.

<Polyolefin-Modified (Meth)Acrylic Resin Particles (B-2): PO-06>

A monomer mixture composed of ST, MMA and BA was used as the monomer raw material liquid, and TMPTA was used as a cross-linking component. The TMPTA was mixed with the monomer mixture prior to reaction. The mass ratio of the various components was ST:MMA:BA:TMPTA=19:39:40:2, and the total mass was 86 g.

A 1 liter four neck flask was charged with 330 g of pure water, 48 g of the emulsifying agent, and 667 g of propylene-ethylene-butene resin particles (resin solid fraction: 200 g), and a dispersion was prepared. Meanwhile, a monomer solution was prepared by dissolving 1.7 g of PERBUTYL 0 as a polymerization initiator within the 86 g of the monomer raw material liquid. Subsequently, 17.54 g of the prepared monomer solution (equivalent to 20% of the total monomer raw material liquid (including TMPTA) and 20% of the polymerization initiator) was added to the previously prepared dispersion, and the resulting mixture was stirred for 30 minutes, thereby swelling the propylene-ethylene-butene resin particles. Subsequently, the temperature was raised to 75° C., 70.16 g of the monomer solution (equivalent to 80% of the total monomer raw material liquid (including TMPTA) and 80% of the polymerization initiator) was added dropwise to the flask over a period of two hours, and the polymerization reaction was then continued for 5 hours at 75° C., thus completing the preparation of polyolefin-modified (meth)acrylic resin particles (PO-06).

The resin solid fraction of the obtained PO-06 was 35%. Further, the mass ratio of propylene-ethylene-butene resin particles (resin solid fraction): monomer raw material liquid was 70:30.

Example 1

<Preparation of Aqueous Coating Material>

The propylene-butene resin component and AC-01 as the (meth)acrylic resin component were mixed together using the blend amounts shown in Table 1 (parts by mass, expressed as solid fractions), thus forming a series of resin compositions for aqueous coating materials.

Aqueous coating materials were then produced by blending 20 parts of each of these resin compositions for aqueous coating materials with 1.5 parts of the hydrophobic film formation assistant, 1.0 parts of the hydrophilic film formation assistant, 0.05 parts of the antifoaming agent, 10.0 parts of the inorganic filler, 13.0 parts of the resin beads, 0.1 parts of the thickener, 54.3 parts of water, and 10.0 parts of the colorant.

The blend amounts of each of the components besides the water are expressed as solid fraction amounts.

<Evaluations>

Each of the obtained aqueous coating materials was coated onto a flat polypropylene substrate to form a coating film.

In order to enable each evaluation to be conducted at two different levels, coating films were formed at two different thicknesses. The thickness of each coating film is shown in Table 1.

(Fingernail Damage)

Each coating film was rubbed using the back of a fingernail, and the surface of the coating film was inspected visually for the appearance of a sheen, and evaluated against the following criteria. The results are shown in Table 1.

OO: no trace of the rubbing was visible.
O: no marked variation was noticeable.
Δ: a faint sheen was observed.
x: a sheen appeared.

(Water Resistance)

A polypropylene ring of diameter 4 cm was placed on the surface of each coating film, a lid having a hole of 5 mm formed therein was compression bonded on top of the ring, 10 ml of distilled water was introduced through the hole using a dropper, and the hole was then sealed using a cellophane tape. After standing for 24 hours at room temperature, the distilled water was removed, and the external appearance of the coating film was inspected visually and evaluated against the following criteria. The results are shown in Table 1.

O: no variation.
Δ: no marked variation.
x: noticeable variation.

(Gasoline Resistance)

A polypropylene ring of diameter 4 cm was placed on the surface of each coating film, a lid having a hole of 5 mm formed therein was compression bonded on top of the ring, 10 ml of gasoline was introduced through the hole using a dropper, and the hole was then sealed using a cellophane tape. After standing for 4 hours at room temperature, the gasoline was removed, and the external appearance of the coating film was inspected visually and evaluated against the following criteria. The results are shown in Table 1.

0: no abnormalities.

x: swelling or bubbling of the coating film was observed.

(Oil Resistance)

A polypropylene ring of diameter 4 cm was placed on the surface of each coating film, a lid having a hole of 5 mm formed therein was compression bonded on top of the ring, 10 ml of cooking oil was introduced through the hole using a dropper, and the hole was then sealed using a cellophane tape. After standing for 10 days at room temperature, the cooking oil was removed. Subsequently, cross-shaped cuts were inserted in the coating film surface, and a cellophane tape was bonded carefully to the cut surface and then peeled away at an angle of 180 degrees. The peeling operation was performed three times, and the degree to which the coating film was retained was evaluated against the following criteria. The results are shown in Table 1.

OO: the coating film did not peel, and no variation was observed in the region that made contact with the cooking oil.

O: the coating film did not peel.

Δ: after the third peeling operation, slight peeling was noticeable.

x: the coating film peeled.

(Resistance to Cosmetic Products)

The surface of each coating film was spotted with a hair styling material ("Auslese Hair Liquid N" manufactured by Shiseido Co., Ltd.) in an amount per unit surface area of 5 g/100 cm$^2$, and following standing for 10 days at room temperature, the hair styling material was removed. Subsequently, cross-shaped cuts were inserted in the coating film surface, and a cellophane tape was bonded carefully to the cut surface and then peeled away at an angle of 180 degrees. The peeling operation was performed three times, and the degree to which the coating film was retained was evaluated against the following criteria. The results are shown in Table 1.

O: the coating film did not peel.

Δ: after the third peeling operation, slight peeling was noticeable.

x: the coating film peeled.

(Resistance to Sunscreen)

The surface of each coating film was coated with a sunscreen cream ("Anessa Sunscreen NA" manufactured by Shiseido Co., Ltd.) in an amount per unit surface area of 5 g/100 cm$^2$, and following standing for 10 days at room temperature, the sunscreen cream was removed. Subsequently, cross-shaped cuts were inserted in the coating film surface, and a cellophane tape was bonded carefully to the cut surface and then peeled away at an angle of 180 degrees. The peeling operation was performed three times, and the degree to which the coating film was retained was evaluated against the following criteria. The results are shown in Table 1.

O: the coating film did not peel.

Δ: after the third peeling operation, slight peeling was noticeable.

x: the coating film peeled.

Examples 2 to 7

As shown in Table 1, with the exceptions of using the propylene-butene resin component as the component (A) in example 2 in the same manner as example 1, but using the propylene-ethylene-butene resin component as the component (A) in examples 3 to 7, and varying the blend amount of the component (A), and the variety and blend amount of the (meth)acrylic resin component (B), resin compositions for aqueous coating materials and aqueous coating materials were prepared and evaluated in the same manner as example 1. The results are shown in Table 1.

Comparative Examples 1 to 5

As shown in Table 2, with the exceptions of using the propylene-ethylene-butene resin component as the component (A), and altering the variety and blend amounts of the components used in forming the resin composition for an aqueous coating material, resin compositions for aqueous coating materials and aqueous coating materials were prepared and evaluated in the same manner as example 1. The results are shown in Table 2.

TABLE 1

| Blend amount (parts by mass) | | Example 1 | Example 2 | Example 3 | Example 4 | Example 5 | Example 6 | Example 7 |
|---|---|---|---|---|---|---|---|---|
| Component (A) | P-B (NA-3006) | 8.0 | 8.0 | | | | | |
| | P-E-B (NA-3002) | | | 8.0 | 8.0 | 8.0 | 14.0 | 4.0 |
| Component (B) | AC-01 | 12.0 | | | | | | 4.0 |
| | PO-01 | | 12.0 | | | | | |
| | PO-02 | | | 12.0 | | | | |
| | PO-03 | | | | 12.0 | | | |
| | PO-04 | | | | | 12.0 | | |
| | PO-05 | | | | | | 6.0 | |
| | PO-06 | | | | | | | 12.0 |
| Film thickness (evaluations at two thickness levels) (μm) | | 45/22 | 44/21 | 42/24 | 45/22 | 45/23 | 46/25 | 46/25 |
| Fingernail damage | | O/O | O/O | O/O | O/O | OO/OO | Δ/Δ | O/O |
| Water resistance | | O/O | O/O | O/O | O/O | O/O | O/O | O/O |
| Gasoline resistance | | O/O | O/O | O/O | O/O | O/O | O/O | O/O |
| Oil resistance | | Δ/Δ | O/O | O/O | OO/OO | OO/OO | O/O | O/O |
| Cosmetic product resistance | | O/O | O/O | O/O | O/O | O/O | O/O | O/O |
| Sunscreen resistance | | O/O | O/O | O/O | O/O | O/O | O/O | O/O |

TABLE 2

| Blend amount (parts by mass) | | Comparative example 1 | Comparative example 2 | Comparative example 3 | Comparative example 4 | Comparative example 5 |
|---|---|---|---|---|---|---|
| Component (A) | P-E-B (NA-3002) | 20.0 | | 16.0 | | |
| Component (B) | AC-01 | | 20.0 | | | 12.0 |
| | PO-01 | | | 4.0 | 20.0 | |
| | PO-02 | | | | | |
| | PO-03 | | | | | |
| | PO-04 | | | | | |
| | PO-05 | | | | | |
| | PO-06 | | | | | |
| Chlorinated PP | | | | | | 8.0 |
| Film thickness (evaluations at two thickness levels) (μm) | | 47/26 | 43/20 | 42/19 | 45/21 | 42/24 |
| Fingernail damage | | X/X | X/X | X/X | Δ/Δ | X/X |
| Water resistance | | ○/○ | ○/○ | ○/○ | ○/○ | ○/Δ |
| Gasoline resistance | | X/X | ○/○ | ○/○ | ○/○ | ○/X |
| Oil resistance | | Δ/○ | X/X | Δ/○ | Δ/X | X/X |
| Cosmetic product resistance | | ○/○ | ○/○ | ○/○ | ○/○ | ○/X |
| Sunscreen resistance | | ○/○ | ○/○ | ○/○ | ○/○ | X/X |

As is evident from Tables 1 and 2, the aqueous coating materials obtained using the resin compositions for aqueous coating materials from the examples all exhibited excellent adhesion to the substrate (namely, to polyolefin-based resins), as well as favorable resistance to the oils contained within gasoline, foodstuffs and cosmetic products and the like. In those cases where polyolefin-modified (meth)acrylic resin particles containing a cross-linking component (B-2: PO-01 to PO-06) were used as the component (B), the oil resistance and resistance to fingernail damage were particularly favorable. Of the various examples, those that used zinc diacrylate (namely, a metal (meth)acrylate) as the cross-linking component (that is, example 4 (in which PO-03 was used as B-2) and example 5 (in which PO-04 was used as B-2)) exhibited particularly superior properties.

In contrast, the aqueous coating material of comparative example 1 used a resin composition for an aqueous coating material composed solely of a component (A) (namely, a hydrocarbon-based resin), and therefore the coating film formed was soft, and the resistance to fingernail damage was inferior to that observed in the examples. Furthermore, because the affinity of the coating film for gasoline, which is a hydrocarbon-based solvent, was high, the resistance of the coating film to gasoline was particularly poor, and the adhesion to polyolefin-based resins was also inferior to that of the examples.

The aqueous coating material of comparative example 2 used a resin composition for an aqueous coating material composed solely of a component (B) (namely, the (meth)acrylic resin particles (B-1: AC-01)), and therefore the adhesion to polyolefin-based resins was poor, and the resistance to cooking oil (a fatty acid-based oil) (namely, the oil resistance) and the resistance to fingernail damage were also inferior to the results observed in the examples.

The aqueous coating material of comparative example 3 included 80% by mass of the component (A) and 20% by mass of the component (B) within the 100% by mass of the resin composition for an aqueous coating material, and therefore although the oil resistance was improved compared with that of comparative example 2, because the proportion of the component (A) was very high, the coating film was soft and suffered from poor resistance to fingernail damage.

The aqueous coating material of comparative example 4 used a resin composition for an aqueous coating material composed solely of a component (B) (namely, the polyolefin-modified (meth)acrylic resin particles (B-2: PO-02)), and therefore the adhesion to polyolefin-based resins was poor, and the resistance to cooking oil (a fatty acid-based oil) (namely, the oil resistance) was also inferior to that observed in the examples. However, because the polyolefin-modified (meth)acrylic resin particles (B-2:PO-02) were used as the component (B), the resistance to fingernail damage was slightly better than that observed for comparative example 2.

The aqueous coating material of comparative example 5 used a resin composition for an aqueous coating material containing chlorinated polypropylene particles, and therefore the resistance to fingernail damage, the oil resistance and the sunscreen resistance were all inferior compared with the results for the examples. In the case where the film thickness was 24 μm, the resistance to the oils contained within gasoline and cosmetic products was also poor.

INDUSTRIAL APPLICABILITY

The present invention is able to provide a resin composition for an aqueous coating material that is useful as a binder within an aqueous coating material that uses no organic solvents or chlorine compounds, and yet exhibits excellent adhesion to polyolefin-based resins, and is capable of forming a coating film that is resistant to discoloration and exhibits favorable resistance to the oils contained within gasoline, cosmetic products and foodstuffs and the like, and is also able to provide a method for producing the resin composition and an aqueous coating material that uses the resin composition.

The invention claimed is:

1. A resin composition for an aqueous coating material, comprising a propylene-butene resin component and/or propylene-ethylene-butene resin component (A), and a (meth)acrylic resin component (B), wherein said (meth)acrylic resin component (B) is polyolefin-modified (meth)acrylic resin particles (B-2), which are composed of a polymer obtained by swelling propylene-ethylene-butene resin particles with a monomer raw material liquid, and subsequently polymerizing the monomer raw material liquid, wherein the monomer raw material liquid comprises styrene at 10 to 20% by mass within 100% by mass of the monomer raw material liquid, and a mass ratio between said propylene-butene resin component and/or propylene-ethylene-butene resin component (A) and said (meth)acrylic resin component (B) is within a range from 30:70 to 60:40.

2. The resin composition of claim 1 wherein said polyolefin-modified (meth)acrylic resin particles (B-2) comprise cross linked resin particles.

3. The resin composition of claim 1 wherein the monomer raw material liquid further comprises methyl (meth)acrylate or n-butyl (meth)acrylate.

4. The resin composition of claim 3 wherein said polyolefin-modified (meth)acrylic resin particles (B-2) comprise cross linked resin particles.

5. The resin composition of claim 1 wherein the monomer raw material liquid further comprises methyl (meth)acrylate and n-butyl (meth)acrylate.

6. The resin composition of claim 5 wherein said polyolefin-modified (meth)acrylic resin particles (B-2) comprise cross linked resin particles.

7. The resin composition of claim 1 wherein the monomer raw material liquid further comprises methyl (meth)acrylate and n-butyl (meth)acrylate at 70 to 90% by mass within 100% by mass of the monomer raw material liquid.

8. The resin composition of claim 7 wherein said polyolefin-modified (meth)acrylic resin particles (B-2) comprise cross linked resin particles.

\* \* \* \* \*